UNITED STATES PATENT OFFICE.

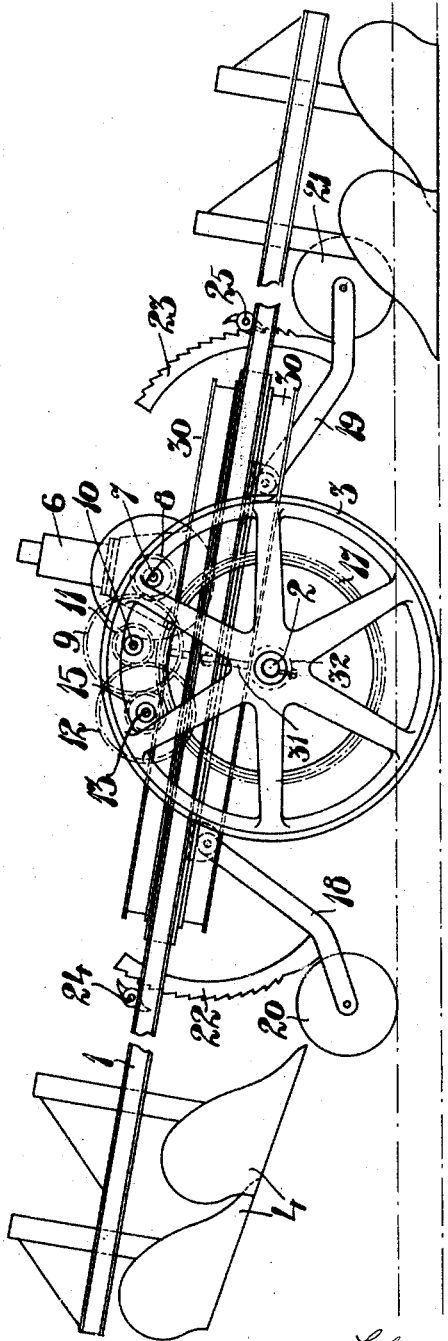

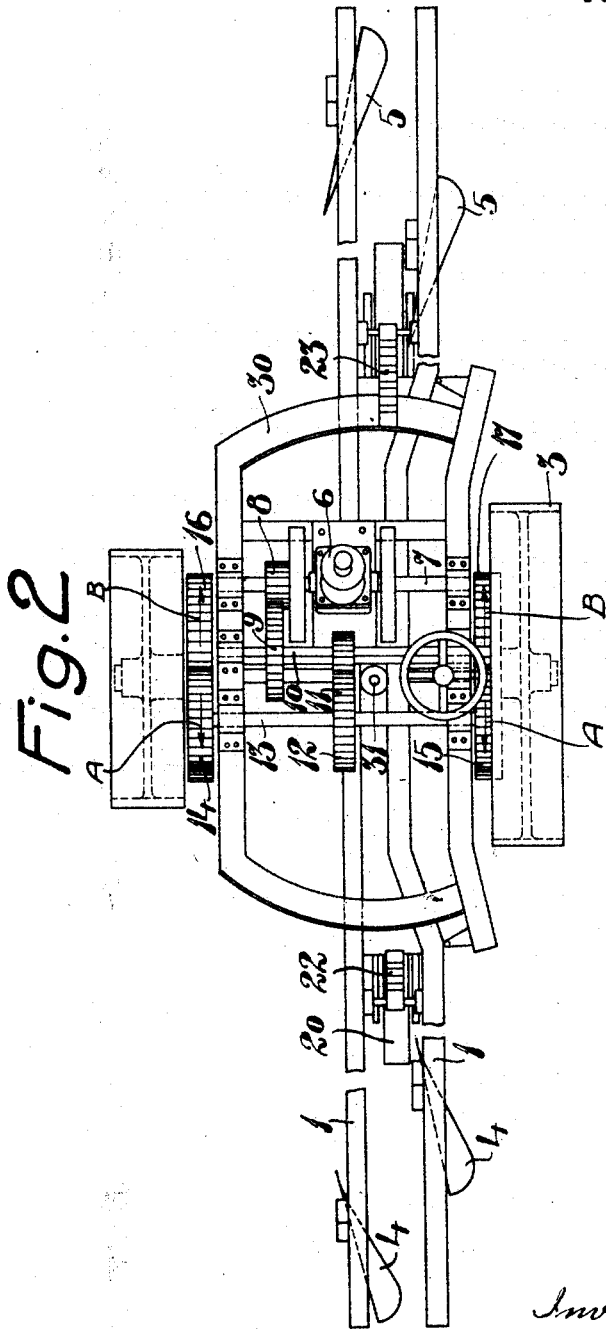

CLAES PHILIP BÄCKSTRÖM, OF SKOKLOSTER, SWEDEN.

PLOWING-MACHINE.

1,366,238.  Specification of Letters Patent.  Patented Jan. 18, 1921.

Application filed August 27, 1919. Serial No. 320,224.

*To all whom it may concern:*

Be it known that I, CLAES PHILIP BÄCKSTRÖM, a subject of the King of Sweden, residing at Skokloster, in the Kingdom of Sweden, have invented new and useful Improvements in Plowing-Machines, of which the following is a specification.

This invention relates to a plowing machine having two gangs of plows carried by a tilting frame which is balanced on an axis, so that when one gang is brought down into action the other is lifted up clear of the land.

The object of the invention is to provide a plowing machine of this kind, the steering of which may be effected in an easy and ready manner.

The principal feature of the invention consists in that the said frame comprises a main frame portion, balanced on said axis and an auxiliary frame portion arranged to move laterally in the main frame, said main frame supporting a driving motor, whereas the auxiliary frame supports the said two gangs of plows.

The principal feature of the invention consists in the provision on the said tilting frame of a driving engine being reversible in itself or provided with a reversing gear, said engine being connected to the shaft on which the said frame is balanced by means of one or more gear wheels arranged to transmit power from the engine to the supporting wheels of the frame in such a way that, when the movement is reversed, the frame is first caused to rotate on its axis into the new plowing position whereupon, after said position is reached, said gear wheels are set in motion for transmitting power to the wheels supporting the frame.

In the accompanying drawing, one form of a plowing machine embodying this invention is illustrated. Figure 1 is an elevation of the plowing machine, and Fig. 2 is a top plan view thereof.

The embodiment of the plowing machine shown comprises a double main frame 30, which is balanced on the shaft 2, carried by two wheels 3 and forming a guide for an auxiliary frame 1, which rotates on a pivot 31, carried by a hub 32 mounted on the shaft 2, said pivot forming right angles to the said shaft 2. Thus, the frame 1 is enabled both to oscillate on the shaft 2, for the purpose hereinafter set forth, and to swing laterally for steering purposes. The frame 1 carries at one end a gang of plows 4 adapted for plowing in one direction, and at its other end another gang of plows 5 for plowing in the opposite direction.

The frame 30 further carries an engine 6 which is assumed to be reversible. Or it may be non-reversible and provided with a reversing gear. The shaft 7 of the engine is connected through the toothed gear 8, 9 to an intermediate shaft 10, which is in turn connected by means of a toothed gear 11, 12 to a shaft 13 carrying two pinions 14, 15 each of which meshes with one of two toothed wheels 16, 17, respectively, carried by the shaft 2 and, preferably, situated adjacent to the supporting wheels 3 or directly attached to the wheels 3.

On opposite sides of the shaft 2, arms 18, 19 are pivotally connected to the frame 30. Each of said arms carries a roller 20 and 21, respectively, resting on the land and serving to maintain the frame 1 in the proper inclined position when in operation. Each of said arms 18 and 19 is provided with a locking mechanism which permits upward movement while preventing downward movement of the frame upon the respective side of the supporting shaft 2. Each of said locking mechanisms comprises a ratchet segment 22 attached to the arm 18 or 19, respectively, and a pawl 24 or 25, respectively, pivoted to the frame 1.

The operation of the plowing machine described is as follows: Assume, that the plowing machine, in the position shown, is at the left hand end of the land and the direction of plowing is to be reversed. To this end the direction of movement of the engine is reversed and then the operator releases the pawl 24 from engagement with the ratchet segment 22, the direction of movement of the engine after the reversing has taken place being such that the pinions 14, 15 will rotate in the direction indicated by the arrows A (Figs. 1 and 2). The frame 1 being now free to rotate downwardly with its left portion (Fig. 1), the pinions 14, 15 will upon said rotation roll downwardly on the toothed wheels 16, 17, thereby causing the frame to move downwardly with its left portion so as to bring the gang of plows 4 down into action, at the same time lifting up the gang of plows 5 clear of the land. When, due to the engagement of the plows into the land, the resistance against the rotation of the frame 1 increases to such a degree as to prevent further rotation the pinions 14, 15 will turn the toothed wheels 16, 17 in the direction indicated by the arrows B in Fig. 2. As the toothed wheels 16, 17 are carried by the shaft of the supporting wheels 3 the plow will now be moved to the right. When the plows 4 in this movement have been forced down into the land to the depth desired the operator releases the pawl 24 from engagement with the ratchet segment 22 thereby preventing further downward movement of that half of the frame 1 carrying the gang of plows 4. When the plow reaches the right end of the land the engine is again reversed thereby causing the frame to tilt back in the same way as described above.

What I claim is:—

1. In a plowing machine of the character described, the combination of two supporting wheels, a common shaft for said wheels, a balanced main frame on said shaft, an auxiliary frame mounted in the main frame to move laterally therein, a motor supported by the main frame and gearing with said wheels, and two gangs of plows supported by the auxiliary frame.

2. In a plowing machine of the character described, the combination of two supporting wheels, a common shaft for said wheels, a double frame mounted to tilt on said shaft, a pivot on said shaft at right angles thereto, an auxiliary frame mounted in said double frame and having a bearing engaged by said pivot, a motor on said double frame gearing with said wheels, and two gangs of plows carried by said auxiliary frame.

3. In a plowing machine of the character described, the combination of two supporting wheels, a common shaft for said wheels, a main frame mounted to tilt on said shaft and comprising two parallel frame units, an auxiliary frame mounted between said frame units to move laterally therebetween, a pivot on said shaft at right angles thereto, a bearing on said auxiliary frame engaged by said pivot, a gang of plows at each end of said auxiliary frames, arms pivotally connected with the main frame supporting a roller on the arms in front of each gang of plows, a ratchet on the arms, and pawls provided on the said auxiliary frame to engage in said ratchet segments.

In testimony whereof I have signed my name.

CLAES PHILIP BÄCKSTRÖM.